United States Patent [19]
Marshburn et al.

[11] Patent Number: 5,853,185
[45] Date of Patent: Dec. 29, 1998

[54] PONTOON BOAT LOADER

[75] Inventors: Rosa A. Marshburn, 1550 Millstone Beach Rd., Dandridge, Tenn. 37725; Ernest L. Marshburn, Dandridge, Tenn.

[73] Assignee: Rosa A. Marshburn, Dandridge, Tenn.

[21] Appl. No.: 890,498

[22] Filed: Jul. 9, 1997

[51] Int. Cl.$^6$ .................................................. B60P 3/10
[52] U.S. Cl. ..................... 280/414.1; 114/344; 414/559
[58] Field of Search .................... 414/478, 479, 414/482, 485, 494, 500, 559, 679, 781, 782, 784; 280/414.1; 193/35 C; 114/344

[56] References Cited

U.S. PATENT DOCUMENTS

| | | | |
|---|---|---|---|
| 3,837,509 | 9/1974 | Gladnick | 280/414.1 X |
| 4,010,962 | 3/1977 | Groblebe | 280/414.1 |
| 4,099,279 | 7/1978 | Park. | |
| 4,103,925 | 8/1978 | Palamara. | |
| 4,114,772 | 9/1978 | Beelow. | |
| 4,136,791 | 1/1979 | Clark. | |
| 4,138,135 | 2/1979 | Hewitt. | |
| 4,243,242 | 1/1981 | Waits. | |
| 4,268,211 | 5/1981 | Schwebke | 280/414.1 X |
| 4,340,332 | 7/1982 | Davies | 280/414.1 X |
| 4,507,016 | 3/1985 | Honour, VII | 114/344 X |
| 4,529,217 | 7/1985 | Wood | 280/414.1 |
| 4,538,952 | 9/1985 | Chase | 280/414.1 X |
| 4,637,770 | 1/1987 | Swadell | 414/495 |
| 4,715,768 | 12/1987 | Capps | 280/414.1 X |
| 4,801,153 | 1/1989 | Wilson | 280/414.1 |
| 5,013,206 | 5/1991 | Ernst et al. | 114/344 X |
| 5,195,767 | 3/1993 | Des Roches | 280/414.1 |
| 5,360,226 | 11/1994 | Gussler, Jr. et al. | 280/414.1 X |
| 5,380,143 | 1/1995 | Mohan | 280/414.1 X |

FOREIGN PATENT DOCUMENTS

| | | | |
|---|---|---|---|
| 2558118 | 7/1985 | France | 280/414.1 |
| 2187681 | 9/1987 | United Kingdom | 414/478 |

*Primary Examiner*—James W. Keenan
*Attorney, Agent, or Firm*—Pitts & Brittian, P.C.

[57] ABSTRACT

A pontoon boat loader to assist in the loading of a pontoon boat onto a trailer. The pontoon boat loader includes a pair of upwardly extending guide posts which may be pulled apart to engage the interior side of each pontoon in order to induce alignment of the boat with the trailer. Each guide post is carried by a slide mount which is received within a slide channel. The slide channel is mounted on a conventional pontoon boat trailer in a conventional manner. The two slide mounts are biased toward each other by way of a tension spring connected at each end to each of the slide mounts. In order to separate the two slide mounts, a cable is provided for each slide mount, with a first end of the cable being secured to the outboard end of the slide mount. The second end of both cables are then secured to each other. A winch is provided to facilitate engagement of the guide posts with the interior side of each pontoon. A winch cable is connected at its distal end to the second ends of the slide mount cables. As the winch is operated to coil the winch cable, the slide mount cables are drawn toward the front of the trailer, thus pulling the slide mounts and guide posts apart. The guide posts are provided with a stationary hub mounted on the slide mounts and a sleeve loosely received over the hub such that the sleeve may freely rotate about the hub to enable free movement of the pontoon boat with respect to the guide post hub as the pontoon boat is engaged with the guide post sleeves and is drawn onto or launched from the trailer.

6 Claims, 3 Drawing Sheets

PONTOON BOAT LOADER

DESCRIPTION

1. Technical Field

This invention relates to the field of pontoon boats. More specifically, the present invention relates to a device for assisting in the loading and unloading of a pontoon boat onto and off of a pontoon boat trailer.

2. Background Art

In the field of boating, it is well known that many boaters use trailers to transport their boats for use in their favorite boating sites. Many boat owners store their boats in a marina such that they do not have to launch their boat for every use. However, many more people prefer to store their boat on a trailer. There are many benefits to this latter preference, including having the ability to boat in any body of water, and not just that with which the marina is associated. Further, by trailering a boat, the boat may be kept in dry storage not only to provide routine maintenance, but also to protect the boat from the elements when not in use. In either situation, it is certain that all boats will have to be trailered at some point in order to transport them from one location to another.

In the specific arena of pontoon boats, it is well known that loading such a boat is often precarious, and therefore requires the assistance of at least one person in addition to the person loading the boat. Several different trailers are provided to meet the specific needs of the pontoon boat, which has a pair of spaced apart pontoons. Typical of these is that disclosed by P. B. Wilson in U.S. Pat. No. 4,801,153 issued on Jan. 31, 1989. In this trailer, a pair of glides are provided for supporting each of the pontoons. A winch is provided for pulling the pontoon boat onto the trailer. Rollers are associated with each glide such that as the winch is operated to pull the pontoon boat onto the trailer, the pontoons engage the rollers which enable easy movement of the pontoon boat. However, it is well known that when loading a boat, the trailer must be at least partially submerged in order to begin the loading process. Otherwise, the boat would have to be lifted from the water prior to loading it on the trailer. After the trailer has been submerged, the boat is floated over at least a portion of the trailer and then a cable connected at one end to the winch is connected at its distal end to the boat. The winch is then operated to pull the boat toward the front end of the trailer. When the boat is floated over the trailer, it is well known that the boat must be maintained in alignment over the trailer such that when the trailer is pulled from the water and the boat engages the trailer, the boat is perfectly nested in the trailer. If the boat is not in alignment with the trailer, damage may be sustained by one or both. However, it is well known that boats tend to drift when in the water, making the task of loading the boat more difficult.

Although Wilson ('153) discloses a trailer adapted for loading and carrying a pontoon boat, he does not account for drift. Typically, there will be at least one person in the water around the boat to assist in aligning the boat over the trailer. This is in addition to the person who attaches the winch line to the boat and operates the winch to pull the boat over the trailer. Because of the problems caused by boat drift, it is known that it is difficult, and in many instances impossible, to load a pontoon boat by one's self, or without having to have at least one person in the water to align the boat with the trailer.

Other devices have been produced to launch and load boats from and onto trailers. Typical of the art are those devices disclosed in the following U.S. Patents:

| U.S. Pat. No. | Inventor(s) | Issue Date |
|---|---|---|
| 4,099,279 | W. S. Park | July 11, 1978 |
| 4,103,925 | A. P. Palamara | Aug. 1, 1978 |
| 4,114,772 | R. E. Beelow | Sept. 19, 1978 |
| 4,136,791 | G. E. Clark | Jan. 30, 1979 |
| 4,138,135 | J. D. Hewitt | Feb. 6, 1979 |
| 4,243,242 | G. D. Waits | Jan. 6, 1981 |
| 4,637,770 | R. A. Swadell | Jan. 20, 1987 |

Of these devices, those disclosed by Park ('279), Palamara ('925) and Hewitt ('135) are each provided with side rails for guiding a boat onto a trailer. Each of these trailers is provided for carrying a single-hull boat such a ski boat or a fishing boat. The side rails as illustrated may be helpful in nesting a pontoon boat onto a trailer, but interfere with loading the boat onto the trailer, especially when the boat becomes misaligned with the trailer.

Beelow ('772) and Swadell ('770) both disclose trailers which may be raised and lowered in order to assist in the launching and loading of a pontoon boat. In either of these devices, in order to load a pontoon boat thereon, the pontoon boat must be stabilized, such as on land. The trailer is then backed under the pontoon. When the trailer is positioned under the boat, the trailer is lifted into engagement with the boat. Neither of these devices discloses a means for aligning the boat with the trailer to assist in the loading process. More specifically, neither of these devices discloses a method for overcoming the effects of drift on a pontoon boat while approaching the trailer.

Finally, that device disclosed by Waits ('242) is a trailer designed for transporting catamarans and the like. Waits also fails to disclose a means for assisting in loading a pontoon boat.

Therefore, it is an object of this invention to provide a means for assisting in the loading of a pontoon boat onto a trailer.

A further object of the present invention is to provide a such a device which is provided to overcome the effects of drift of a pontoon boat while being loaded, thereby obviating the need of a person in the water to stabilize the boat.

Still another object of the present invention is to provide such a device which may be adapted to any conventional pontoon boat trailer.

DISCLOSURE OF THE INVENTION

Other objects and advantages will be accomplished by the present invention which serves to assist in the loading of a pontoon boat onto a trailer by overcoming the effects of drift of the pontoon boat while being loaded, thereby obviating the need of a person in the water to stabilize the boat. The pontoon boat loader is further designed to be adapted to any conventional pontoon boat trailer. The pontoon boat loader includes a pair of upwardly extending guide posts which may be pulled apart to engage the interior side of each pontoon in order to induce alignment of the boat with the trailer. Each guide post is carried by a slide mount which is received within a slide channel. The slide channel is mounted on a conventional pontoon boat trailer in a conventional manner.

The two slide mounts are biased toward each other such that until engaged, the guide posts are positioned proximate each other. To accomplish this, a tension spring is connected at each end to each of the slide mounts. In order to separate the two slide mounts, a cable is provided for each slide mount, with a first end of the cable being secured to the outboard end of the slide mount. The second end of both cables are then secured to each other. A winch is provided to facilitate engagement of the guide posts with the interior side of each pontoon. The winch is mounted on the trailer near the front. A winch cable is connected at its distal end to the second ends of the slide mount cables. As the winch is operated to coil the winch cable, the slide mount cables are drawn toward the front of the trailer, thus pulling the slide mounts and guide posts apart.

A pulley is provided at each end of the slide channel. Each slide mount cable is received by one of the pulleys, thus facilitating extension from and retraction into the slide channel. Where appropriate, pulleys may also be mounted to the boat trailer in order to provide an easy travel path for each of the slide mount cables and the winch cable.

The guide posts are provided with a stationary hub mounted on the slide mounts. A sleeve is provided to loosely receive the hub such that the sleeve may freely rotate about the hub. The sleeve thus serves to enable free movement of the pontoon boat with respect to the guide post hub as the pontoon boat is engaged with the guide post sleeves and is drawn onto or launched from the trailer.

BRIEF DESCRIPTION OF THE DRAWINGS

The above mentioned features of the invention will become more clearly understood from the following detailed description of the invention read together with the drawings in which.

BEST MODE FOR CARRYING OUT THE INVENTION

Figure 1:
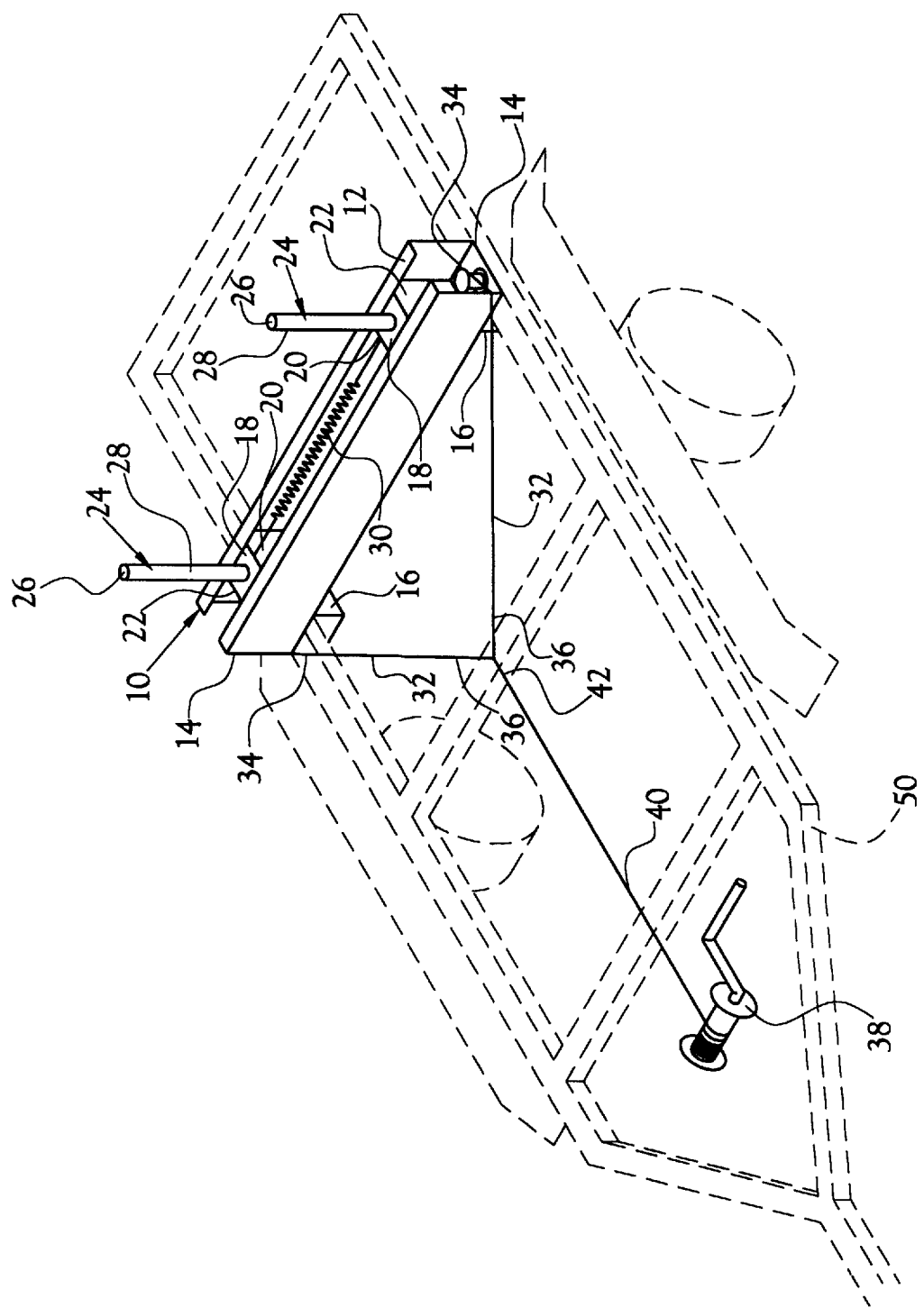
FIG. 1 is a perspective view of the pontoon boat loader constructed in accordance with several features of the present invention.

A pontoon boat loader incorporating various features of the present invention is illustrated generally at 10 in the figures. The pontoon boat loader 10 is designed for assisting in the loading of a pontoon boat 52 onto a trailer 50 by overcoming the effects of drift of the pontoon boat 52 while being loaded, thereby obviating the need of a person in the water to stabilize the boat 52. Moreover, in the preferred embodiment the pontoon boat loader 10 is designed to be adapted to any conventional pontoon boat trailer 50.

The pontoon boat loader 10 of the present invention is comprised primarily of a pair of upwardly extending guide posts 24 which may be pulled apart to engage the interior side 56 of each pontoon 54 in order to induce alignment of the boat 52 with the trailer 50. Each guide post 24 is carried by a slide mount 18 which is received within a slide channel 12. The slide channel 12 is mounted on a conventional pontoon boat trailer 50 in a conventional manner. In the illustrated embodiment, the slide channel 12 is secured to the trailer by means of a pair of clamps 16 to facilitate removal of the pontoon boat loader 10.

The two slide mounts 18 are biased toward each other such that until engaged, the guide posts 24 are positioned proximate each other. To this extent, the illustrated biasing device 30 is a tension spring connected at each end to the inboard end 20 of each of the slide mounts 18. In order to separate the two slide mounts 18, a cable 32 is provided for each slide mount 18, with a first end 34 of the cable 32 being secured to the outboard end 22 of the slide mount 18. The second end 36 of both cables 32 are then secured to each other. As will be understood, a single cable 32 may be used in lieu of two cables 32 as described, with one end being connected to the outboard end 22 of each of the slide mounts 18.

A winch 38 is provided to facilitate engagement of the guide posts 24 with the interior side 56 of each pontoon 54. The winch 38 is mounted on the trailer 50 near the front. A winch cable 40 is connected at its distal end 42 to the second ends 36 of the slide mount cables 32, or to the midpoint of the single slide mount cable 32, in a conventional fashion. Thus, with the slide channel 12 mounted on the trailer 50, as the winch 38 is operated to coil the winch cable 40, the slide mount cables 32 are drawn toward the front of the trailer 50, thus pulling the slide mounts 18 and guide posts 24 apart. The guide posts 24 may be locked in this extended position by locking the winch 38 in a conventional manner. Conversely, the guide posts 24 are returned to their retracted position by uncoiling the winch cable 40. In the latter case, the biasing device 30 serves to pull the slide mounts 18 toward each other as tension is released from the winch cable 40 and ultimately the slide mount cables 32.

In order to assist in pulling the slide mount cables 32, a pulley 14 is provided at each end of the slide channel 12. Each slide mount cable 32 is received by one of the pulleys 14, thus facilitating extension from and retraction into the slide channel 12. Where appropriate, pulleys 14 may also be mounted to the boat trailer 50 in order to provide an easy travel path for each of the slide mount cables 32 and the winch cable 40.

In the preferred embodiment, the guide posts 24 are provided with a stationary hub 26 mounted on the slide mounts 18 as described above. A sleeve 28 is provided to loosely receive the hub 26 such that the sleeve 28 may freely rotate about the hub 26. Therefore, the sleeve 28 serves to enable free movement of the pontoon boat 52 with respect to the guide post hub 26, and consequently the trailer 50, as the pontoon boat 52 is engaged with the guide post sleeves 28 and is drawn onto or launched from the trailer 50.

Figure 2:
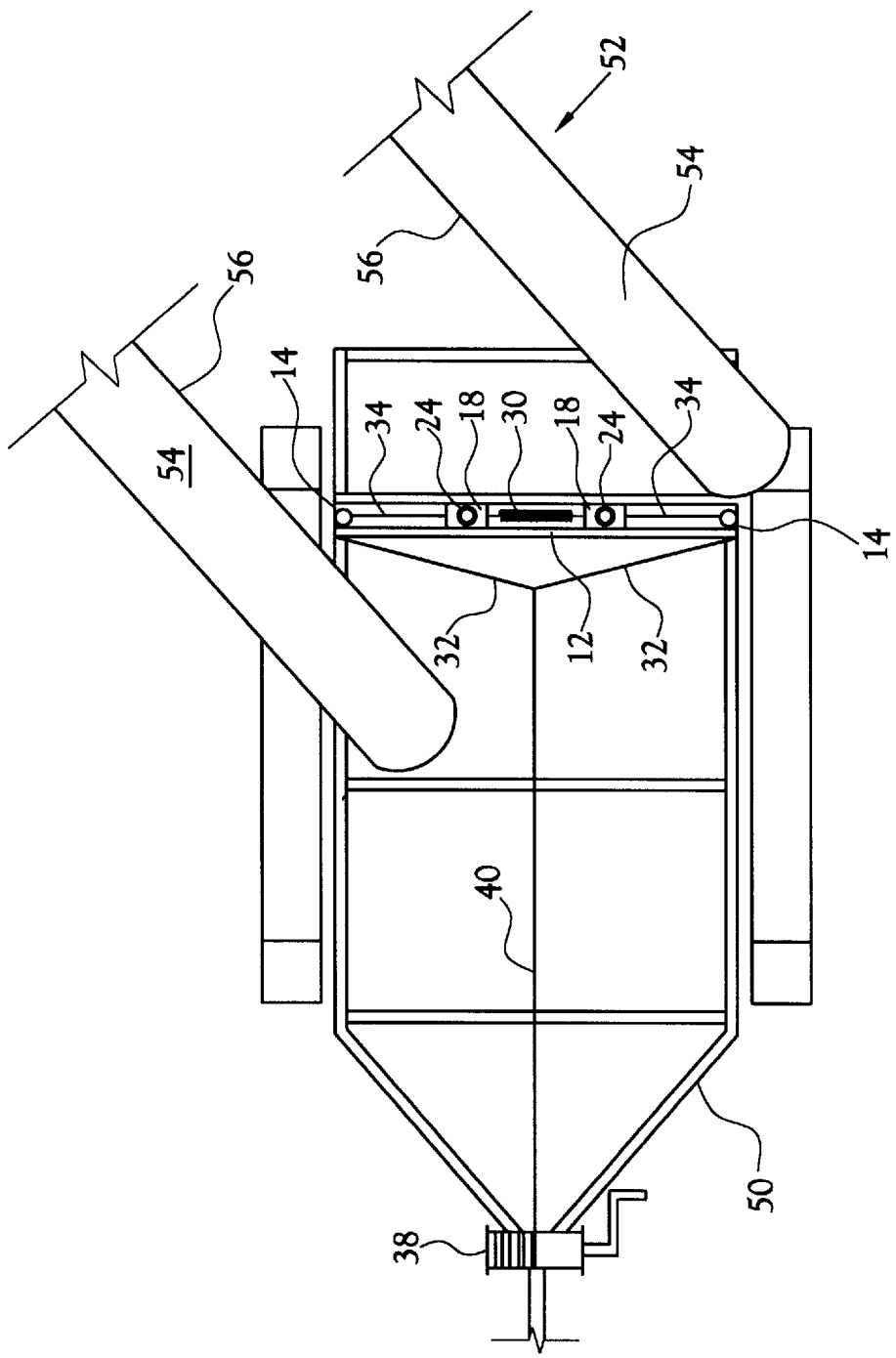
FIG. 2 illustrates a top elevation view of the pontoon boat loader showing the guide posts in an unengaged position.
Figure 3:
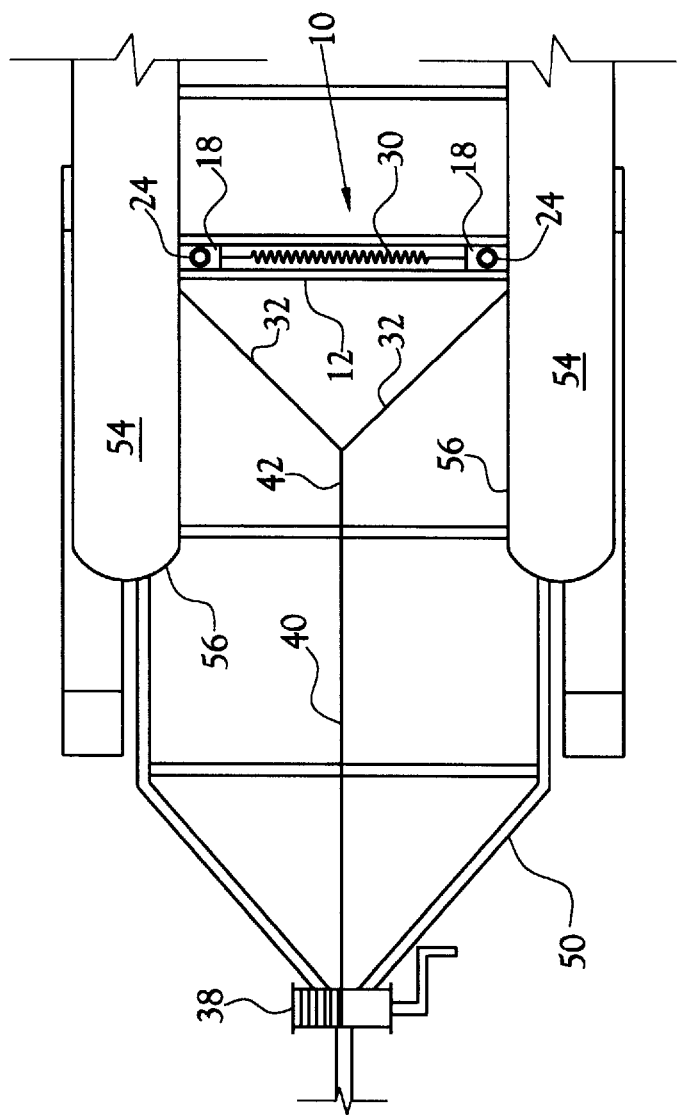
FIG. 3 illustrates a top elevation view of the pontoon boat loader showing the guide posts in an engaged position.

FIG. 2 illustrates the pontoon boat loader 10 in an unengaged orientation. A pontoon boat 52 is illustrated as being floated over a portion of the trailer 50. The pontoon boat 52 is shown as not being aligned with the trailer 50. In the prior art, a person would be required to enter the water and push the boat 52 into alignment. However, FIG. 3 illustrates that when the present invention is engaged by operation of the winch 38, the guide posts 24 are separated in order to engage the interior sides 56 of the pontoons 54 in order to bring the pontoon boat 52 into alignment with the trailer 50. The pontoon boat 52 is then pulled onto the trailer 50 using a conventional trailer winch (not shown), and the trailer 50 and boat 52 are then pulled from the water. After the boat 52 has been loaded on the trailer 50, the pontoon boat loader winch 38 may be operated to disengage the guide posts 24.

It will be understood by those skilled in the art that because the trailer winch cable (not shown) is maintained in a tensioned fashion, as the trailer winch cable is pulled to pull the pontoon boat 52, the engaged guide posts 24 serve to limit the rotation of the pontoon boat 52 with respect to the trailer 50. Thus, as the boat 52 is drawn toward the front of the trailer 50, the boat 52 is gradually to rotated to be in alignment with the trailer 50. To ensure that alignment does occur, the preferred placement of the pontoon boat loader 10 is between the aft and the center of the pontoon boat 52 when loaded on the trailer 50. It will be seen that more than one pontoon boat loader 10 may be used in association with one trailer 50. For instance, although not illustrated, it is envisioned that two pontoon boat loaders 10 may be used in combination and spaced apart a short distance with respect to the span of the pontoons 54. In this instance, when the pontoon boat 52 is moved over the trailer 50 with both pontoon boat loaders 10 therebetween, and the guide posts 24 are engaged, the guide posts 24 will be disposed at four corners of a square. Upon engagement of each of the guide posts 24 on the interior sides 56 of the pontoons 54, rotation of the pontoon boat 52 with respect to the trailer 50 is made impossible.

From the foregoing description, it will be recognized by those skilled in the art that a pontoon boat loader offering advantages over the prior art has been provided. Specifically, the pontoon boat loader provides a means for assisting in the loading of a pontoon boat onto a trailer by overcoming the effects of drift of the pontoon boat while being loaded, thereby obviating the need of a person in the water to stabilize the boat. Moreover, in the preferred embodiment the pontoon boat loader 10 is designed to be adapted to any conventional pontoon boat trailer.

While a preferred embodiment has been shown and described, it will be understood that it is not intended to limit the disclosure, but rather it is intended to cover all modifications and alternate methods falling within the spirit and the scope of the invention as defined in the appended claims.

Having thus described the aforementioned invention, we claim:

1. A pontoon boat loader attachable to a pontoon boat trailer for assisting in loading a pontoon boat onto the pontoon boat trailer, said pontoon boat including a pair of parallel spaced apart pontoons, said pontoon boat loader comprising:

an attachment device for attaching said pontoon boat loader to the pontoon boat trailer;

a pair of guide posts disposed in a vertical orientation;

a pair of slide mounts, one each of said pair of guide posts being carried by one each of said pair of slide mounts;

a guide channel configured to receive said pair of slide mounts, said guide channel being configured to limit movement of said pair of slide mounts to axial movement with respect to said guide channel;

a biasing device for biasing each of said pair of slide mounts toward one another; and an engagement device secured to each of said pair of slide mounts, said engagement device being provided for pulling each of said slide mounts away from each other such that said guide posts are moved apart to engage an interior side of the pontoon boat pontoons.

2. The pontoon boat loader of claim 1 wherein said biasing device is a tension spring having first and second ends, one each of said first and second ends being mounted on one each of said pair of slide mounts.

3. The pontoon boat loader of claim 1 wherein said engagement device includes at least one slide mount cable connected to an outboard end of each of said pair of slide mounts, said slide mount cable being pulled to pull said pair of slide mounts to accomplish engagement of said pair of guide posts with the interior side of the pontoons.

4. The pontoon boat loader of claim 3 further comprising a winch having a winch cable, said winch cable having a distal end secured to said at least one slide mount cable, said winch cable being used to pull said at least one slide mount cable to facilitate separation of said pair of guide posts and engagement of said pair of guide posts with the interior side of the pontoons.

5. The pontoon boat loader of claim 1 wherein each of said pair of guide posts includes a mounting hub secured to said slide mount and a sleeve configured to loosely receive said mounting hub, said sleeve being freely rotatable about said mounting hub to enable free movement of the pontoon boat with respect to said guide post.

6. A pontoon boat loader attachable to a pontoon boat trailer for assisting in loading a pontoon boat onto the pontoon boat trailer, said pontoon boat including a pair of parallel spaced apart pontoons, said pontoon boat loader comprising:

an attachment device for attaching said pontoon boat loader to the pontoon boat trailer;

a pair of guide posts disposed in a vertical orientation, each of said pair of guide posts including a mounting hub and a sleeve configured to loosely receive said mounting hub, said sleeve being freely rotatable about said mounting hub to enable-free movement of the pontoon boat with respect to said guide post;

a pair of slide mounts, one each of said pair of guide post mounting hubs being carried by one each of said pair of slide mounts;

a guide channel configured to receive said pair of slide mounts, said guide channel being configured to limit movement of said pair of slide mounts to axial movement with respect to said guide channel;

a biasing device for biasing each of said pair of slide mounts toward one another;

an engagement device secured to each of said pair of slide mounts, said engagement device being provided for pulling each of said slide mounts away from each other such that said guide posts are moved apart to engage an interior side of the pontoon boat pontoons, said biasing device defining a tension spring having first and second ends, one each of said first and second ends being mounted on one each of said pair of slide mounts, said engagement device including at least one slide mount cable connected to an outboard end of each of said pair of slide mounts, said slide mount cable being pulled to pull said pair of slide mounts to accomplish engagement of said pair of guide posts with the interior side of the pontoons; and a winch having a winch cable, said winch cable having a distal end secured to said at least one slide mount cable, said winch cable being used to pull said at least one slide mount cable to facilitate separation of said pair of guide posts and engagement of said pair of guide posts with the interior side of the pontoons.

* * * * *